US008283800B2

(12) United States Patent
Salter et al.

(10) Patent No.: US 8,283,800 B2
(45) Date of Patent: Oct. 9, 2012

(54) VEHICLE CONTROL SYSTEM WITH PROXIMITY SWITCH AND METHOD THEREOF

(75) Inventors: Stuart C. Salter, White Lake, MI (US); Anna Miller Hill, Belleville, MI (US); Cornel Lewis Gardner, Romulus, MI (US); Joseph S. Witek, Shelby Township, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 324 days.

(21) Appl. No.: 12/788,663

(22) Filed: May 27, 2010

(65) Prior Publication Data

US 2011/0291474 A1 Dec. 1, 2011

(51) Int. Cl.
*B60L 1/00* (2006.01)

(52) U.S. Cl. ........................................................ 307/9.1

(58) Field of Classification Search .................... 307/9.1
See application file for complete search history.

(56) References Cited

U.S. PATENT DOCUMENTS 3,382,588 A 5/1968 Serrell et al.
3,544,804 A 12/1970 Gaumer et al.
3,691,396 A 9/1972 Hinrichs
3,826,979 A 7/1974 Steinmann
4,205,325 A 5/1980 Haygood et al.
4,232,289 A 11/1980 Daniel
4,257,117 A 3/1981 Besson
4,290,052 A 9/1981 Eichelberger et al.
4,340,813 A 7/1982 Sauer
4,413,252 A 11/1983 Tyler et al.
4,446,380 A 5/1984 Moriya et al.
4,453,112 A 6/1984 Sauer et al.
4,494,105 A 1/1985 House
4,514,817 A 4/1985 Pepper et al.
4,613,802 A 9/1986 Kraus et al.
4,743,895 A 5/1988 Alexander
4,748,390 A 5/1988 Okushima et al.

(Continued)

FOREIGN PATENT DOCUMENTS

EP 1152443 11/2001

(Continued)

OTHER PUBLICATIONS

"Touch Sensors Design Guide" by Atmel, 10620 D-AT42-04/09, Revised Apr. 2009, 72 pages, Copyrighted 2008-2009 Atmel Corporation.
ATMEL™ Touch Sensor Design Guide, 10620D-AT42-04/09.
Smart Touch® Keypad Design Guide, Keypad Part No. 1310674, Natron Corporation, Found at: http://www.nartron.com/?p=pdfviewer&file=host/nartron/File/SmartTouch.pdf.

*Primary Examiner* — Robert L. Deberadinis
(74) *Attorney, Agent, or Firm* — Raymond L. Coppiellie; Price Heneveld LLP

(57) ABSTRACT

A control system for controlling a position of a window and method thereof are provided. The control system includes a cover at least partially adapted to have a trough, the cover having a interior side and an exterior side, and a first proximity sensor adjacent to the interior side that is configured to detect an object within the first portion of the trough. The control system further includes a second proximity sensor adjacent to the interior side that is configured to detect the object within the second portion of the trough, and a processor in communication with the sensors, and configured to communicate a control signal to the window as a function of the detection of the sensors, wherein the control signal is based upon a most recent detection of the sensors when both sensors are activated within a first time period.

20 Claims, 4 Drawing Sheets

U.S. PATENT DOCUMENTS 4,827,029 A 5/1989 Kleemann et al.
4,855,550 A 8/1989 Schultz, Jr.
4,872,485 A 10/1989 Laverty, Jr.
4,899,138 A 2/1990 Araki et al.
4,901,074 A 2/1990 Sinn et al.
4,924,222 A 5/1990 Antikidis et al.
4,972,070 A 11/1990 Laverty, Jr.
5,025,516 A 6/1991 Wilson
5,033,508 A 7/1991 Laverty, Jr.
5,063,306 A 11/1991 Edwards
5,108,530 A 4/1992 Niebling, Jr. et al.
5,153,590 A 10/1992 Charlier
5,159,159 A 10/1992 Asher
5,159,276 A 10/1992 Reddy, III
5,177,341 A 1/1993 Balderson
5,215,811 A 6/1993 Reafler et al.
5,239,152 A 8/1993 Caldwell et al.
5,270,710 A 12/1993 Gaultier et al.
5,294,889 A 3/1994 Heep et al.
5,329,239 A 7/1994 Kindermann et al.
5,341,231 A 8/1994 Yamamoto et al.
5,403,980 A 4/1995 Eckrich
5,451,724 A 9/1995 Nakazawa et al.
5,467,080 A 11/1995 Stoll et al.
5,494,180 A 2/1996 Callahan
5,548,268 A 8/1996 Collins
5,566,702 A 10/1996 Philipp
5,572,205 A 11/1996 Caldwell et al.
5,586,042 A 12/1996 Pisau et al.
5,598,527 A 1/1997 Debrus et al.
5,670,886 A 9/1997 Wolff et al.
5,681,515 A 10/1997 Pratt et al.
5,730,165 A 3/1998 Philipp
5,747,756 A 5/1998 Boedecker
5,760,554 A 6/1998 Bustamante
5,790,107 A 8/1998 Kasser et al.
5,825,352 A 10/1998 Bisset et al.
5,864,105 A 1/1999 Andrews
5,917,165 A 6/1999 Platt et al.
5,920,309 A 7/1999 Bisset et al.
5,942,733 A 8/1999 Allen et al.
5,963,000 A 10/1999 Tsutsumi et al.
5,973,417 A 10/1999 Goetz et al.
5,973,623 A 10/1999 Gupta et al.
6,010,742 A 1/2000 Tanabe et al.
6,011,602 A 1/2000 Miyashita et al.
6,031,465 A 2/2000 Burgess
6,035,180 A 3/2000 Kubes et al.
6,040,534 A 3/2000 Beukema
6,157,372 A 12/2000 Blackburn et al.
6,172,666 B1 1/2001 Okura
6,215,476 B1 4/2001 Depew et al.
6,219,253 B1 4/2001 Green
6,231,111 B1 5/2001 Carter et al.
6,275,644 B1 8/2001 Domas et al.
6,288,707 B1 9/2001 Philipp
6,292,100 B1 9/2001 Dowling
6,320,282 B1 11/2001 Caldwell
6,323,919 B1 11/2001 Yang et al.
6,369,369 B2 4/2002 Kochman et al.
6,377,009 B1 4/2002 Philipp
6,379,017 B2 4/2002 Nakabayashi et al.
6,427,540 B1 8/2002 Monroe et al.
6,452,138 B1 9/2002 Kochman et al.
6,452,514 B1 9/2002 Philipp
6,457,355 B1 10/2002 Philipp
6,464,381 B2 10/2002 Anderson, Jr. et al.
6,466,036 B1 10/2002 Philipp
6,485,595 B1 11/2002 Yenni, Jr. et al.
6,529,125 B1 3/2003 Butler et al.
6,535,200 B2 3/2003 Philipp
6,537,359 B1 3/2003 Spa
6,587,097 B1 7/2003 Aufderheide et al.
6,607,413 B2 8/2003 Stevenson et al.
6,614,579 B2 9/2003 Roberts et al.
6,617,975 B1 9/2003 Burgess
6,652,777 B2 11/2003 Rapp et al.
6,654,006 B2 11/2003 Kawashima et al.
6,661,410 B2 12/2003 Casebolt et al.
6,664,489 B2 12/2003 Kleinhans et al.
6,713,897 B2 3/2004 Caldwell
6,734,377 B2 5/2004 Gremm et al.
6,738,051 B2 5/2004 Boyd et al.
6,740,416 B1 5/2004 Yokogawa et al.
6,756,970 B2 6/2004 Keely, Jr. et al.
6,773,129 B2 8/2004 Anderson, Jr. et al.
6,795,226 B2 9/2004 Agrawal et al.
6,812,424 B2 11/2004 Miyako
6,819,316 B2 11/2004 Schulz et al.
6,841,748 B2 1/2005 Serizawa et al.
6,847,018 B2 1/2005 Wong
6,879,250 B2 4/2005 Fayt et al.
6,884,936 B2 4/2005 Takahashi et al.
6,891,530 B2 5/2005 Umemoto et al.
6,929,900 B2 8/2005 Farquhar et al.
6,940,291 B1 9/2005 Ozick
6,967,587 B2 11/2005 Snell et al.
6,977,615 B2 12/2005 Brandwein, Jr.
6,987,605 B2 1/2006 Liang et al.
7,030,513 B2 4/2006 Caldwell
7,053,360 B2 5/2006 Balp et al.
7,063,379 B2 6/2006 Steuer et al.
7,091,886 B2 8/2006 DePue et al.
7,106,171 B1 9/2006 Burgess
7,151,450 B2 12/2006 Beggs et al.
7,215,529 B2 5/2007 Rosenau
7,218,498 B2 5/2007 Caldwell
7,232,973 B2 6/2007 Kaps et al.
7,248,151 B2 7/2007 Mc Call
7,254,775 B2 8/2007 Geaghan et al.
7,255,622 B2 8/2007 Stevenson et al.
7,295,168 B2 11/2007 Saegusa et al.
7,339,579 B2 3/2008 Richter et al.
7,342,485 B2 3/2008 Joehl et al.
7,489,053 B2 2/2009 Gentile et al.
2001/0019228 A1 9/2001 Gremm
2001/0028558 A1 10/2001 Rapp et al.
2002/0167439 A1 11/2002 Bloch et al.
2002/0167704 A1 11/2002 Kleinhans et al.
2004/0056753 A1 3/2004 Joel et al.
2004/0160072 A1 8/2004 Carter et al.
2004/0197547 A1 10/2004 Bristow et al.
2005/0242923 A1 11/2005 Pearson et al.
2006/0082545 A1 4/2006 Choquet et al.
2006/0279015 A1 12/2006 Wang
2006/0287474 A1 12/2006 Crawford et al.
2007/0051609 A1 3/2007 Parkinson
2007/0226994 A1 10/2007 Wollach et al.
2007/0232779 A1 10/2007 Moody et al.
2008/0202912 A1 8/2008 Boddie et al.
2008/0257706 A1 10/2008 Haag
2008/0272623 A1 11/2008 Kadzban et al.
2009/0108985 A1 4/2009 Haag et al.
2009/0235588 A1 9/2009 Patterson et al.

FOREIGN PATENT DOCUMENTS

EP 1327860 6/2005
EP 1562293 8/2005
EP 1693684 8/2006
GB 2158737 11/1985
GB 2418741 4/2006
JP 61188515 8/1986
JP 04082416 3/1992
JP 07315880 12/1995
JP 08138446 5/1996
JP 11065764 3/1999
JP 11110131 4/1999
JP 11260133 9/1999
JP 11316553 11/1999
JP 2000047178 2/2000
JP 2000075293 3/2000
JP 2006007764 1/2006
WO 9636960 11/1996
WO 9963394 12/1999
WO 2006093398 9/2006
WO 2007022027 2/2007
WO 2008121760 10/2008

VEHICLE CONTROL SYSTEM WITH PROXIMITY SWITCH AND METHOD THEREOF

FIELD OF THE INVENTION

The present invention generally relates to a vehicle control system, and more particularly, a control system having a proximity switch for controlling a position of a window in a vehicle.

BACKGROUND OF THE INVENTION

Generally, a moonroof switch in a vehicle is a tilt switch that toggles through control options based upon the position of the moonroof. Typically, if the moonroof is fully closed and the tilt switch is actuated in one direction, the moonroof will move to a fully open position, and if the tilt switch is actuated in the other direction, then the moonroof tilts open. Alternatively, if the moonroof is fully opened and the tilt switch is actuated in one direction, the moonroof will move to a fully closed position, and if the tilt switch is actuated in the other direction, no action is taken. Additionally, if the moonroof is opened in the tilt position, and the tilt switch is actuated in one direction, the moonroof will move to a fully closed position, while if the tilt switch is actuated in the other direction, no action is taken. Also, if the moonroof is partially open and the tilt switch is actuated in one direction, the tilt switch opens to a fully open position, while if the tilt switch is actuated in the other direction, the moonroof is fully closed.

SUMMARY OF THE INVENTION

Accordingly, in a first disclosed embodiment, a control system for controlling a position of a window that is configured to be in a fully open position, a fully closed position, and intermediate positions thereof is provided. The control system includes a substantially rigid cover at least partially adapted to have an elongated trough including a first portion and a second portion, the substantially rigid cover having an interior side and an exterior side, and a first proximity sensor adjacent to the interior side of the substantially rigid cover, and proximate the first portion of the trough, wherein the first proximity sensor is configured to detect an object within the first portion of the trough. The control system further includes a second proximity sensor adjacent to the interior side of the substantially rigid cover, and proximate the second portion of the trough, wherein the second proximity sensor is configured to detect the object within the second portion of the trough, and a processor in communication with the first proximity sensor and the second proximity sensor, the processor configured to communicate a control signal to the window as a function of the detection of the first proximity sensor and second proximity sensor, wherein the control signal is based upon a most recent detection of the first and second proximity sensors when both the first proximity sensor and the second proximity sensor are activated within a first time period.

In another disclosed embodiment, a method for controlling a position of a window that is configured to be in a fully open position, a fully closed position, and intermediate positions thereof is provided. The method includes the steps of detecting an object proximate to a first proximity sensor, detecting an object proximate to a second proximity sensor, communicating a control signal to move the window to a different position as a function of the detection of the object, wherein the control signal is based upon a most recent detection of the first and second proximity sensors if both first and second proximity sensors are activated within a first time period, and communicating the control signal to stop movement of the window as a function of the object detection while the window is in motion and after expiration of the first period of time.

In another disclosed embodiment, a method for controlling a moonroof including detecting an object proximate a first sensor, detecting the object proximate a second sensor, and communicating a signal to move the moonroof based upon a most recent detection of the first and second sensors when the first and second sensors are activated within a first time period, while disregarding previous detections and after expiration of a delay period.

These and other aspects, objects, and features of the present invention will be understood and appreciated by those skilled in the art upon studying the following specification, claims, and appended drawings.

DETAILED DESCRIPTION OF PREFERRED EMBODIMENTS

As required, detailed embodiments of the present invention are disclosed herein; however, it is to be understood that the disclosed embodiments are merely exemplary of the invention that may be embodied in various and alternative forms. The figures are not necessarily to detailed circuit design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 2:
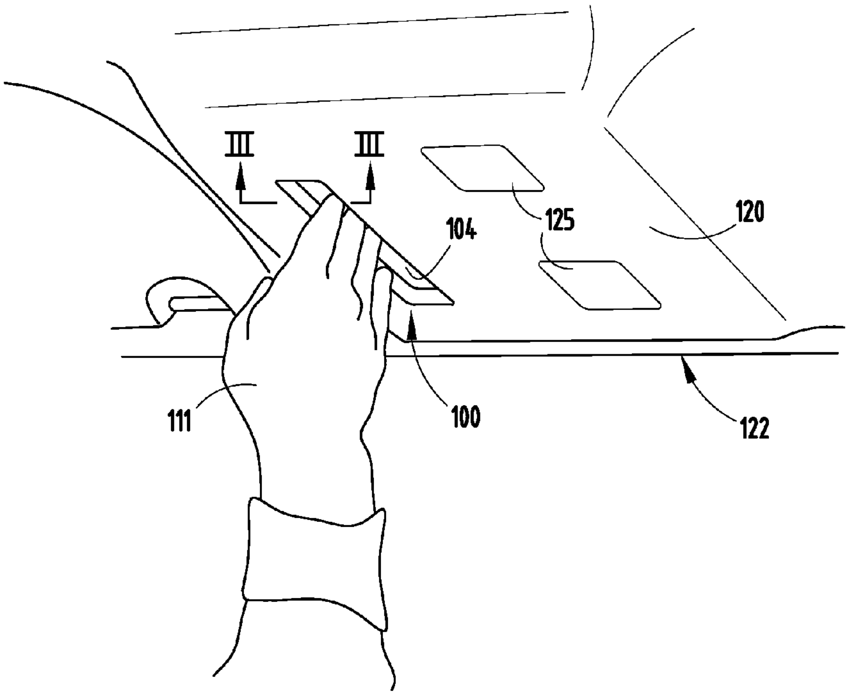
FIG. 2 is an environmental view of a control system for controlling a moonroof in a headliner of a vehicle, in accordance with one embodiment of the present invention.
Figure 3:
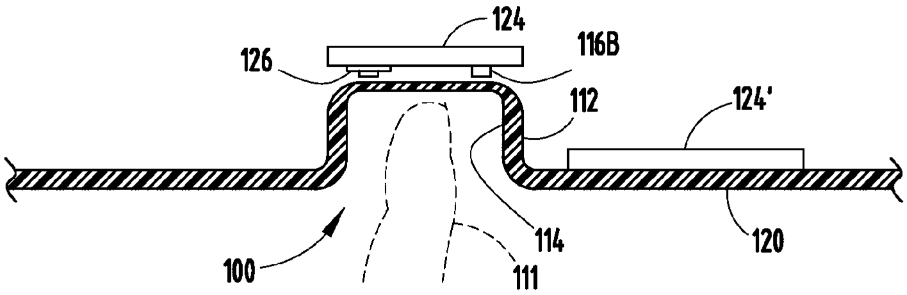
FIG. 3 is a part cross-sectional view of a control system in a headliner of a vehicle as taken across the line in FIG. 2, in accordance with one embodiment of the present invention.
Figure 4:
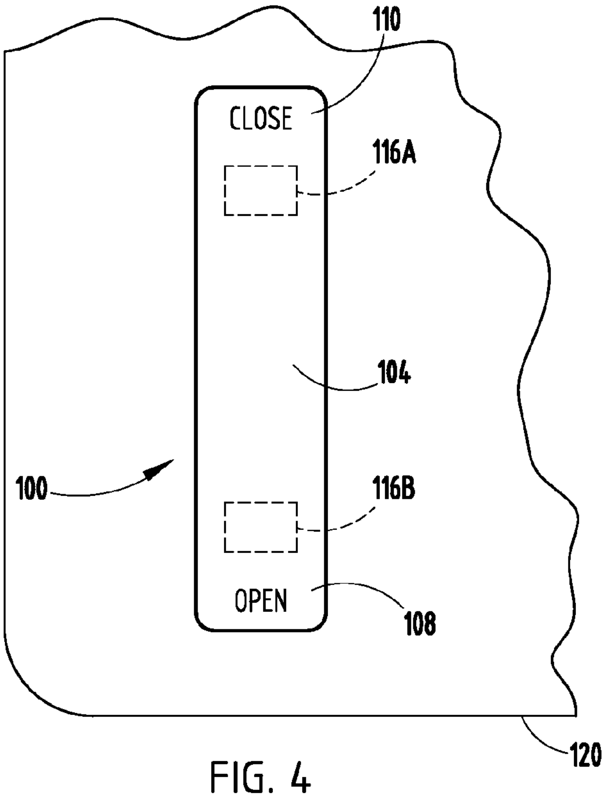
FIG. 4 is a schematic diagram of a control system having a plurality of capacitive switches, in accordance with one embodiment of the present invention.

With respect to FIGS. 1-4, 6, and 7, a vehicle control system is generally shown at reference identifier 100. Typically, the control system 100 is used for controlling a window 102, such as, but not limited to, a moonroof. The control system 100 can include a surface 104 having a trough 106 that includes a first portion 108 and a second portion 110 (FIG. 4). The control system can further include a plurality of proximity sensors to detect an object 111 (FIGS. 2 and 3) within the first and second portions 108, 110. According to one embodiment, the plurality of proximity sensors includes first proximity sensor 116A and a second proximity sensor 116B (FIG. 4). The control system 110 can also include a processor 118 (FIGS. 6 and 7) in communication with the sensors 116A, 116B, and can be configured to control the window 102 based upon a most recent detection of the sensors 116A, 116B when both the sensors 116A and 116B are activated within a time period and after expiration of a delay, as described in greater detail herein.

Figure 1:
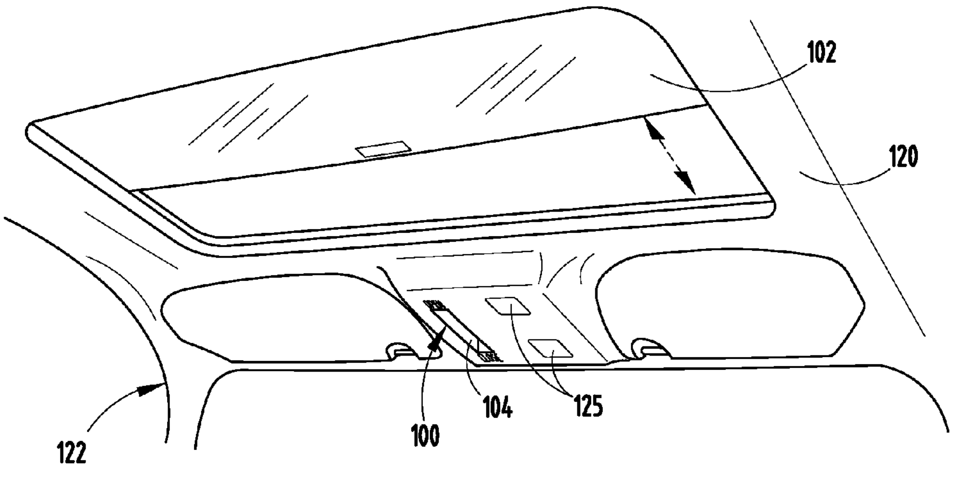
FIG. 1 is an environmental view of a control system for controlling a moonroof in a headliner of a vehicle, in accordance with one embodiment of the present invention.
Figure 6:
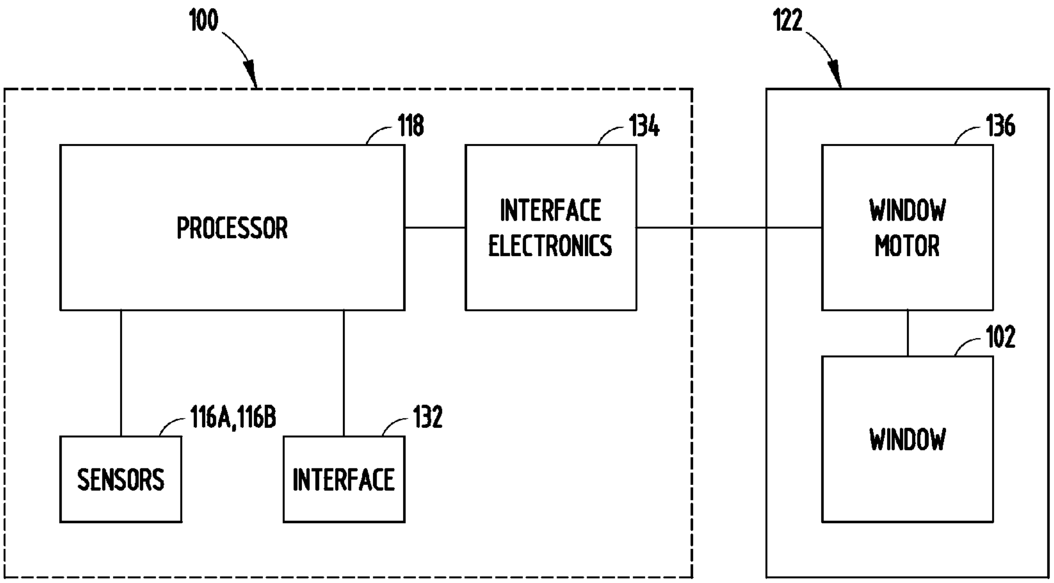
FIG. 6 is a block diagram of a control system, in accordance with one embodiment of the present invention.

By way of explanation and not limitation, the control system 100 can be integrated with a headliner 120 of a vehicle generally indicated at reference identifier 122 (FIGS. 1, 2, and 6). Typically, the surface 104 is included in the headliner 120, such that the trough 106 extends in a front-to-rear direction of the vehicle 122. In such an embodiment, a user can swipe the object 111 (e.g., one or more fingers) through the trough 106 in the direction the window 102 is to be moved. Thus, if a user wishes to open the window 102, the user can swipe their one or more fingers through the trough 106 in a backwards direction, while if the user desires to close the window, the user can swipe their one or more fingers forward through the trough 106.

The window 102 can be integrated with the vehicle 122, such that the window 102 can be a moonroof integrated with the vehicle 122, and the surface 104 is located approximately in a front and center portion of a headliner 120 of the vehicle 122, wherein the motion of the object 111 through the trough 106 simulates opening and closing the moonroof 102, according to one embodiment. As described in greater detail herein, a user can open the window 102 by swiping the object 111 in a natural motion for opening the window but proximate the sensors 116A, 116B; however, the control system 100 does not determine a direction of object 111 movement, and can control the window 102 without regard to detections of the sensors 116A, 116B that are not the most recent detection thereof. However, it should be appreciated by those skilled in the art that the window 102 can be other windows integrated into the vehicle 122. It should be further appreciated by those skilled in the art that control of the window 102, as described herein, is for purposes of explanation and not limitation, and that the control system 100 can be used to control other components or devices integrated or used with the vehicle 122.

As exemplary illustrated in FIGS. 2 and 3, the object 111 can be one or more fingers of the user. Typically, the object 111 can be any object suitable for activating the proximity switch 116A, 116B (e.g., altering or disturbing the capacitive field). Further, the proximity sensors 116A, 116B can be configured to have adequate sensitivity to detect a single finger of the user, one or more fingers of the user that are covered by a glove, a child's one or more fingers, the like, or a combination thereof.

According to one embodiment, the control system 100 can be used for controlling a position of the window 102 that can be configured to be in a fully open position, a fully closed position, and intermediate positions thereof. The surface 104 can be a substantially rigid proximity surface 104 that is at least partially adapted to have the elongated trough 106 that includes the first portion 108 and the second portion 110. The surface 104 can have an interior side 112 and an exterior side 114. The first sensor 116A can be a proximity sensor and can be adjacent to the interior side 112 of the surface 104, and proximate the first portion 108 of the trough 106, wherein the first proximity sensor 116A can be configured to detect an object 111 within the first portion 108 of the trough 106. The second sensor 116B can be a proximity sensor and can be adjacent to the interior side 112 of the surface 104, and proximate the second portion 110 of the trough 106, wherein the second proximity sensor 116B can be configured to detect the object 111 within the second portion 110 of the trough 106.

Further, the processor 118 can be in communication with the first proximity sensor 116A and the second proximity sensor 116B. The processor 118 can be configured to communicate a control signal to the window 102 as a function of the detection of the first proximity sensor 116A and the second proximity sensor 116B, wherein the control signal can be based upon a most recent detection of the first and second proximity sensors 116A, 116B when both the first proximity sensor 116A and the second proximity sensor 116B are activated within a first time period, as described in greater detail herein. For purposes of explanation and not limitation, the first time period can be approximately one hundred milliseconds to one hundred fifty milliseconds (100 ms-150 ms). According to one embodiment, communication between the processor 118, the window 102, the first proximity sensor 116A, the second proximity sensor 116B, or a combination thereof, can be any type of electrical connection or electrical communication between the components thereof.

The control signal can be communicated to the window 102 without regard to previous detection of the first proximity sensor 116A and the second proximity sensor 116B other than the most recent detection of one of the first proximity sensor 116A and the second proximity sensor 116B, according to one embodiment. Thus, the control signals are communicated to the window 102 without regard to a direction of movement of the object 111 with respect to the first proximity sensor 116A and the second proximity sensor 116B.

According to one embodiment, the first proximity sensor 116A and the second proximity sensor 116B are capacitive proximity sensors. However, it should be appreciated by those skilled in the art that other types of proximity sensors can be utilized in the control system 100. Additionally or alternatively, the processor 118 can be configured to communicate the control signal to the window 102 as a function of a detection of the object 111 by one of the first proximity sensor 116A and the second proximity sensor 116E if the window 102 is in motion and detection of the first and second proximity sensors 116A, 116B is after expiration of the first time period, such that the movement of the window 102 is stopped. In operation, if the user swipes the object 111 through the trough 106 in a forward-to-rear direction, the window 102 can move towards a fully opened position. While the window 102 is in motion, if the user wants to stop the window 102 at a position intermediate to the fully closed and fully opened positions, the user can activate one of the proximity sensors 116A, 116B.

The processor 118 can be configured to communicate a fully closed signal to the window 102 when the first proximity sensor 116A continuously detects the object 111 for a second time period. Similarly, the processor 118 can be configured to communicate a fully open signal to the window 102 of the second proximity sensor 116B continuously detects the object 111 for the second time period. Thus, a one touch fully opened or closed activation can be implemented in the control system 100. By way of explanation and not limitation, the second time period can be between approximately one hundred fifty milliseconds and three hundred fifty milliseconds (150 ms-350 ms). Typically, the second time period range can include the delay period (e.g., approximately one hundred milliseconds (100 ms)), a delay time period of a window motor 136 (FIG. 6) (e.g., approximately fifty milliseconds (50 ms)), and any optional additional time (e.g., approximately zero milliseconds to two hundred milliseconds (0 ms-200 ms)).

According to an additional or alternative embodiment, the window 102 can be controlled to be placed in a position intermediate of the fully closed position and the fully opened position. In such an embodiment, the user can place the object 111 proximate one of the first and second proximity sensors 116A, 116B, and hold the object 111 in the location for a third period of time (e.g., greater than approximately three hundred fifty milliseconds (350 ms)). The window 102 can move in the direction associated with the first or second proximity sensor 116A, 116B that is being activated. The user can then retract the object 111 from being proximate one of the first or second proximity sensors 116A, 116B to stop movement of the window 102. Thus, the user can place the window 102 in a desired position between the fully opened position and the fully closed position.

According to one embodiment, the processor 118 can be configured to communicate the control signal to the window 102 when a detection is made by one of the first proximity sensors 116A and the second proximity sensor 116B and a delayed time period has expired. Thus, when one of the first and second proximity sensors 116A, 116E is activated and communicates such activation to the processor 118, the processor 118 does not immediately control the control signal to the window 102, but instead waits for a delayed time period to expire to determine if the other of the first and second proximity sensors 116A, 116B is activated. In such an embodiment, in operation, when a user of the control system 100 swipes the object 111 through the trough 106 and first activates the first proximity sensor 116A, the processor 118 does not immediately communicate the control signal to close the window 102, but instead, the processor 118 delays communication of the control signal to determine if the second proximity sensor 116B is activated within the delayed time period, if the processor 118 timely receives the activation of the second proximity sensor 116B, the processor 118 communicates the control signal based upon the most recent detection (i.e., the second proximity sensor 116B to open the window 102). For purposes of explanation and not limitation, the delay time period is approximately one hundred milliseconds to one hundred fifty milliseconds (100 ms-150 ms).

The first portion 108 and the second portion 110 can be partially overlapping, such that a capacitive field emitted by the first proximity sensor 116A and the capacitive field emitted by the second proximity sensor 116B partially overlap, according to one embodiment. Typically, in operation, if the object 111 is placed in the overlapping area of the first and second portions 108, 110, and both the first and second proximity sensors 116A, 116B are approximately simultaneously activated, the processor 118 can be configured to disregard both activations of the first and second proximity sensors 116A, 116B.

With respect to an exemplary embodiment illustrated in FIG. 3, the first and second proximity sensors 116A, 116B can be electrically connected to a printed circuit board (PCB) 124. Additionally, at least one light source 126 can be electrically connected to the PCB 124. In such an embodiment, the surface 104 can be at least partially translucent or transparent, such that the light source 126 can emit light between the PCB 124 and the surface 104 and illuminate the surface 104. Thus, the surface 104 and the PCB 124 can define a light pipe that is in optical communication with the light source 126. The surface 104 can be treated, the spacing between the surface 104 and the PCB 124 can be altered non-uniformly, the like, or a combination thereof to have an appearance of even light distribution from the light source 124 and propagating through the transparent or translucent surface 104.

A text, symbol, and/or other suitable graphic can be included on the surface 104 to indicate to the user the different portions of the surface 104. By way of explanation and not limitation, such text, symbols, and/or graphics can be laser etched onto the paint of the "A" surface of the surface 104 (FIG. 4). Alternatively, such text, symbols, and/or graphics can be etched on a surface adjacent to the surface 104 (FIGS. 1 and 2). Typically, the light source 126 is one or more light emitting diodes (LEDs); however, it should be appreciated by those skilled in the art that the light source 126 can be other suitable light sources. The processor 118 can be connected to a second PCB 124' that is in electrical communication with the PCB 124, but offset from the trough 106.

As exemplary illustrated in FIGS. 1 and 2, additional one or more sensors 125 can be integrated with the headliner 120 adjacent to the surface 104. The additional one or more sensors 125 can be in communication with the processor 118 to control the window 102, control other devices integrated with the vehicle 122 (e.g., interior lights), the like, or a combination thereof.

According to one embodiment, the trough 106 can be configured to comply with Federal Motor Vehicle Safety Standards and Regulations (FMVSS) to prevent accidental activation (e.g., a forty millimeter (40 mm) ball test). According to an alternate embodiment, the surface 102 is not configured to define the trough 106, but is a planar surface or configured with another contoured shape.

Figure 5:
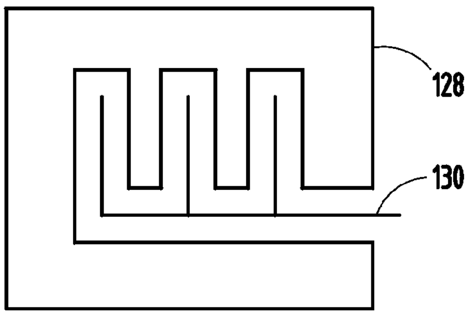
FIG. 5 is a schematic diagram illustrating an exemplary layout of electrodes in a capacitive switch, in accordance with one embodiment of the present invention.

In regards to an exemplary embodiment illustrated in FIG. 5, the first and second proximity sensors 116A, 116B can have X-electrode 128 and Y-electrode 130 that are generally interdigitated, such that they form interlocking "fingers." Typically, the X-electrode 128 substantially surrounds the Y-electrode 130 in order to contain the field between the two electrodes 128, 130. Typically, each of the first and second proximity sensors 116A, 116B are between approximately six millimeters squared (6 $mm^2$) and twelve millimeters squared (12 $mm^2$) with a thickness of approximately 0.6 mm. In such an embodiment, the PCB 124 can be approximately twelve millimeters to fourteen millimeters (12 mm-14 mm) wide. The interdigitating X- and Y-electrodes 128, 130 and capacitive switches can allow for activation of the sensors 116A, 116B by a non-linear motion of the object 111, and are further described in ATMEL™ Touch Sensor Design Guide, 10620D-AT42-04/09, the entire reference hereby being incorporated herein by reference. According to an alternate embodiment, the sensors 116A, 116B can be in a flooded-x configuration.

With respect to an exemplary embodiment illustrated in FIG. 6, the control system 100 can include the first and second proximity sensors 116A, 116B and the processor 118. The control system 100 can further include interface circuitry 132, which can be configured for communicating with a computer device for reflashing of new software to be stored in and/or executed by the control system 100. Additionally, the control system 100 can include interface electronics 134 in communication between the processor 118 and the window motor 136 that can be configured to actuate the window 102.

Figure 7:
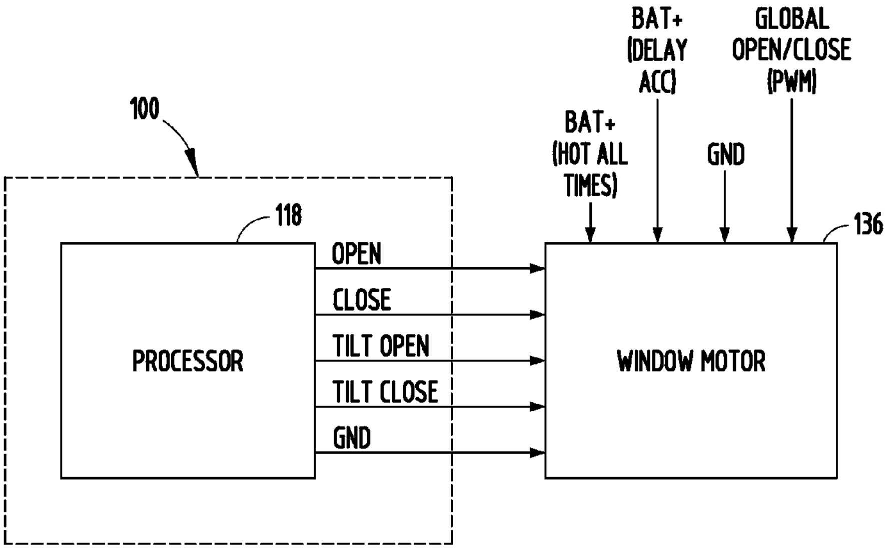
FIG. 7 is a block diagram of a control system illustrating exemplary communicated control signals, in accordance with one embodiment of the present invention.

According to an exemplary embodiment illustrated in FIG. 7, the window 102 can be a moonroof, such that the processor 118 can be configured to communicate an open signal, a closed signal, and a tilt open signal. Typically, the signals from the processor 118 are active low (GND) and the control signals are pulled up to BAT+ inside the window motor 136 when not pulled low. A low on a moonroof signal line of approximately three hundred fifty milliseconds (350 ms) or greater can cause a function to start. If any other proximity sensor 116A, 116B is activated while the window 102 is in operation, the window 102 can stop operation. Additionally or alternatively, if the low on the moonroof signal line is continued for greater than approximately three hundred fifty milliseconds (350 ms), when the low on the moonroof signal is removed, the window 102 is stopped.

Figure 8:
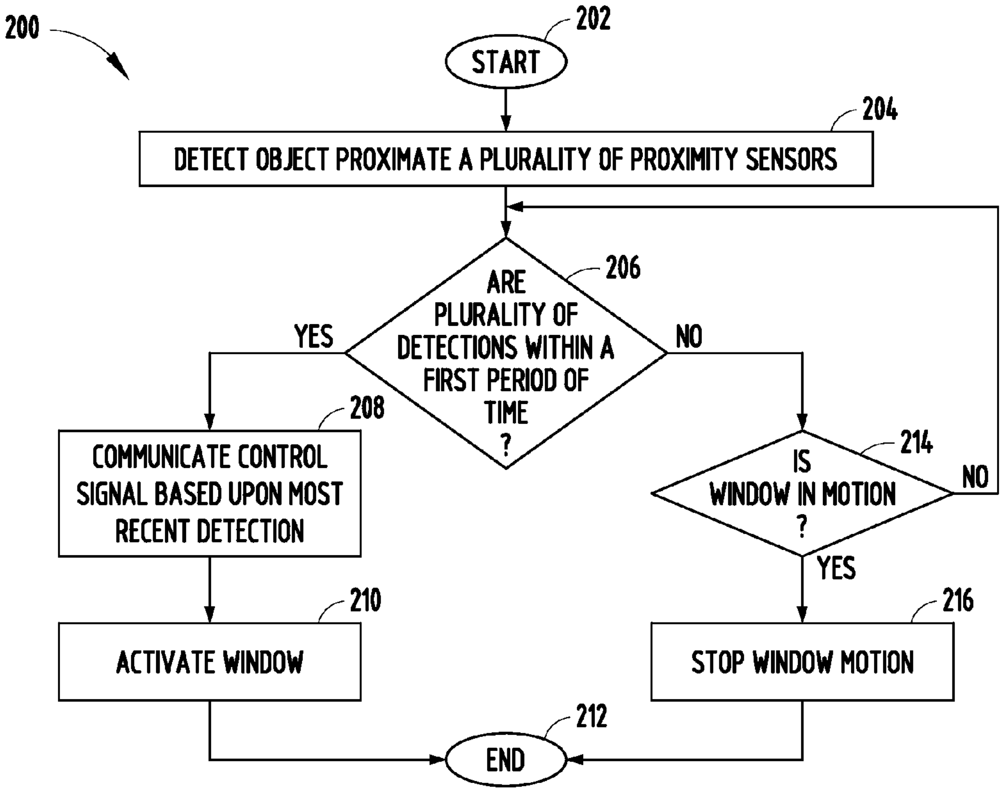
FIG. 8 is a flowchart illustrating a method of controlling a position of a window, in accordance with one embodiment of the present invention.

With respect to FIGS. 1-4 and 8, a method for controlling a position of the window 102 that can be configured to be in a fully open position, a fully closed position, and intermediate positions thereof is generally shown in FIG. 8 at reference identifier 200. The method 200 starts at step 202, and proceeds to step 204, wherein an object proximate a plurality of sensors 116A, 116E is detected. At decision step 206 it is determined if a plurality of detections are within a first period of time. If it is determined at decision step 206 that there is a plurality of detections within a first period of time, then the method 200 proceeds to step 208. At step 208 a control signal is communicated, which is based upon the most recent detection. At step 210, the window 102 is actuated based upon the communicated control signal, and the method 200 then ends at step 212.

However, if it is determined at decision step 206 that the plurality of detections are not within a first period of time, then the method 200 proceeds to decision step 214, wherein it is determined if the window is in motion. If it is determined that the window 102 is not in motion, then the method 200 returns to step 206. However, if it is determined at decision step 214 that the window 102 is in motion, then the method 200 proceeds to step 216. At step 216 the window 102 motion is stopped, and the method then ends at step 212. It should be appreciated by those skilled in the art that the method 200 can continuously run so as long as electrical power is being supplied to the control system 100.

According to an alternate embodiment, the control system 100 can be configured so that the processor 118 communicates a control signal to fully open or fully close the window 102 if the object 111 is swiped through greater than approximately forty percent (40%) of the trough 106 in a respective direction. If the user swipes the object 111 through less than approximately twenty percent (20%) of the trough 106 on either end, the control system 100 can be configured so that the processor 118 communicates a control signal to open or close the window 102 a distance approximately proportional to the distance of the object 111 swipe, and in a respective direction. Typically, in such an embodiment, more than two (2) sensors 116A, 116B are approximately linearly positioned along the trough 106.

Advantageously, the control system 100 and method 200 allow for a user to make a hand movement in the direction they wish the window 102 to be moved, without having to physically contact or depress buttons. Therefore, a more natural motion similar to if a user reached and manually opened or closed the window 102 is simulated by the control system 100 and method 200, as compared to use of a tilt switch. It should be appreciated by those skilled in the art that additional or alternative advantages may be present from the control system 100 and method 200. It should further be appreciated by those skilled in the art that the above disclosed elements and steps can be combined in additional or alternative manners not explicitly described herein.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A control system for controlling a position of a window that is configured to be in a fully open position, a fully closed position, and intermediate positions thereof, said control system comprising:

a substantially rigid cover at least partially adapted to have an elongated trough comprising a first portion and a second portion, said substantially rigid cover having a interior side and an exterior side;

a first proximity sensor adjacent to said interior side of said substantially rigid cover, and proximate said first portion of said trough, wherein said first proximity sensor is configured to detect an object within said first portion of said trough;

a second proximity sensor adjacent to said interior side of said substantially rigid cover, and proximate said second portion of said trough, wherein said second proximity sensor is configured to detect said object within said second portion of said trough; and a processor in communication with said first proximity sensor and said second proximity sensor, said processor configured to communicate a control signal to the window as a function of said detection of said first proximity sensor and second proximity sensor, wherein said control signal is based upon a most recent detection of said first and second proximity sensors when both said first proximity sensor and said second proximity sensor are activated within a first time period.

2. The control system of claim 1, wherein said control signal is communicated to the window without regard to previous detection of said first proximity sensor and said second proximity sensor other than said most recent detection of one of said first proximity sensor and said second proximity sensor.

3. The control system of claim 2, wherein said control signal is communicated to the window without regard to a direction of movement of said object with respect to said first proximity sensor and said second proximity sensor.

4. The control system of claim 1, wherein said first proximity sensor and said second proximity sensor are capacitive proximity sensors.

5. The control system of claim 1, wherein said processor is further configured to communicate a control signal to the window as a function of a detection of said object by one of said first proximity sensor and said second proximity sensor after expiration of said first period of time, such that movement of the window is stopped.

6. The control system of claim 1, wherein said processor is further configured to communicate a fully closed signal to the window when said first proximity sensor continuously detects said object for a second time period, and communicate a fully open signal to the window when said second proximity sensor continuously detects said object for said second time period.

7. The control system of claim 1, wherein said processor is further configured to communicate said control signal to the window when a detection is made by one of said first proximity sensor and said second proximity sensor, and a delay time period has expired.

8. The control system of claim 1, wherein the window is integrated with a vehicle.

9. The control system of claim 8, wherein the window is a moonroof integrated with said vehicle, and the substantially rigid cover is located approximately in a front and center portion of a headliner of said vehicle, such that motion of the object through said elongated trough simulates opening and closing the moonroof.

10. A method for controlling a position of a window that is configured to be in a fully open position, a fully closed position, and intermediate positions thereof, said method comprising the steps of:

detecting an object proximate to a first proximity sensor;

detecting an object proximate to a second proximity sensor;

communicating a control signal to move the window to a different position as a function of said detection of said object, wherein said control signal is based upon a most recent detection of said first and second proximity sensors if both first and second proximity sensors are activated within a first time period; and communicating said control signal to stop movement of the window as a function of said object detection while the window is in motion and after expiration of said first time period.

11. The method of claim 10, wherein said steps of communicating said control signal further comprise communicating said control signal without regard to previous detections by said first proximity sensor and said second proximity sensor other than said most recent detection of one of said first proximity sensor and said second proximity sensor.

12. The method of claim 11, wherein said control signal is communicated to the window without regard to a direction of movement of said object with respect to said first proximity sensor and said second proximity sensor.

13. The method of claim 10 further comprising the step of:

communicating said control signal to the window when a detection is made by one of said first proximity sensor and said second proximity sensor and a delay time period has expired.

14. The method of claim 10 further comprising the steps of:

detecting said object proximate said first proximity sensor for a second time period; and communicating a fully closed signal to the window.

15. The method of claim 10 further comprising the steps of:

detecting said object proximate said second proximity sensor for a second time period; and communicating a fully open signal to the window.

16. A method for controlling a moonroof comprising:

detecting an object proximate a first sensor;

detecting said object proximate a second sensor; and communicating a signal to move the moonroof based upon a most recent detection of said first and second sensors when said first and second sensors are activated within a first time period, while disregarding previous detections and after expiration of a delay period.

17. The method of claim 16, wherein said control signal is communicated to the moonroof without regard to a direction of movement of said object with respect to said first and second sensors.

18. The method of claim 16 further comprising the steps of:

detecting said object proximate said first sensor continuous for a second period of time; and communicating a fully closed signal to the moonroof.

19. The method of claim 16 further comprising the steps of:

detecting said object proximate said second sensor continuous for a second period of time; and communicating a fully open signal to the moonroof.

20. The method of claim 16, wherein said first and second sensors are capacitive proximity sensors.

* * * * *